(12) United States Patent
Sharma et al.

(10) Patent No.: US 12,299,468 B2
(45) Date of Patent: May 13, 2025

(54) MANAGEMENT OF VIRTUAL MACHINE APPLICATIONS BASED ON RESOURCE USAGE BY NETWORKING PROCESSES OF A HYPERVISOR

(71) Applicant: VMWARE LLC, Palo Alto, CA (US)

(72) Inventors: Shivali Sharma, Pune (IN); Vasantha Kumar Dhanasekar, Pune (IN); Rahul Kumar, Pune (IN); Rayanagouda Bheemanagouda Patil, Pune (IN)

(73) Assignee: VMWare LLC, Palo Alto, CA (US)

( * ) Notice: Subject to any disclaimer, the term of this patent is extended or adjusted under 35 U.S.C. 154(b) by 983 days.

(21) Appl. No.: 16/820,752

(22) Filed: Mar. 17, 2020

(65) Prior Publication Data
US 2021/0216348 A1 Jul. 15, 2021

(30) Foreign Application Priority Data
Jan. 13, 2020 (IN) .............................. 202041001473

(51) Int. Cl.
*G06F 9/455* (2018.01)

(52) U.S. Cl.
CPC .................... *G06F 9/45558* (2013.01); *G06F 2009/45595* (2013.01)

(58) Field of Classification Search
None
See application file for complete search history.

(56) References Cited

U.S. PATENT DOCUMENTS

| 11,080,083 B1* | 8/2021 | Tandon | G06F 9/44526 |
| 2008/0184227 A1* | 7/2008 | Matsumoto | G06F 9/5077 718/1 |
| 2015/0277957 A1* | 10/2015 | Shigeta | G06F 9/45558 718/1 |
| 2018/0300065 A1* | 10/2018 | Talwar | G06F 3/067 |

OTHER PUBLICATIONS

Muda, A Strategy for Virtual Machine Migration Based on Resource Utilization, 2010, Keio University, Graduate School of Media and Governance, Master's Thesis, pp. 33-54 (Year: 2010).*

* cited by examiner

*Primary Examiner* — Anil Khatri
*Assistant Examiner* — Melissa A Headly
(74) *Attorney, Agent, or Firm* — Quarles & Brady LLP

(57) ABSTRACT

Described herein are systems, methods, and software to manage resources for networking operations on a host computing system. In one implementation, a hypervisor on a host computing system, may monitor computing resources used by a networking process provided by the hypervisor. The hypervisor further determines that the one or more computing resources used by the networking process satisfy at least one criterion and, in response to determining that the computing resources satisfy at least one criterion, notifies one or more virtual machines supported by the hypervisor to modify one or more execution parameters associated with at least one application in each of the one or more virtual machines.

20 Claims, 6 Drawing Sheets

| RESOURCE CONDITIONS 510 | VIRTUAL MACHINE IDS 511 |
|---|---|
| CONDITION 520 | VM GROUP 525 |
| CONDITION 521 | VM GROUP 526 |
| CONDITION 522 | VM GROUP 527 |
| CONDITION 523 | VM GROUP 528 |
| CONDITION 524 | VM GROUP 529 |

500

MANAGEMENT OF VIRTUAL MACHINE APPLICATIONS BASED ON RESOURCE USAGE BY NETWORKING PROCESSES OF A HYPERVISOR

RELATED APPLICATIONS

Benefit is claimed under 35 U.S.C. 119(a)-(d) to Foreign Application Serial No. 202041001473 filed in India entitled "MANAGEMENT OF VIRTUAL MACHINE APPLICATIONS BASED ON RESOURCE USAGE BY NETWORKING PROCESSES OF A HYPERVISOR", on Jan. 13, 2020, by VMware, Inc., which is herein incorporated in its entirety by reference for all purposes.

BACKGROUND

Virtualization techniques have gained popularity and are now commonplace in data centers and other computing environments, increasing the efficiency with which physical computing resources are used. These virtualization techniques may include the deployment of virtual machines, containers, and software defined networks that together can provide the desired operations of a particular organization.

In some implementations, the software defined networks may implement firewall rules and other forwarding operations that can be used to inspect ingress and egress packets associated with virtual machines and determine actions. These actions may include forwarding the packets, blocking the packets, generating a log of the packets, or performing some other action related to the packets. However, while software defined networks may provide networking operations for virtual machines and containers executing on a host, the software defined networking processes may have difficulty managing resources as the network and throughput expands. As an example, a firewall operation on a host may be incapable of processing large quantities of communications, as processing resources, memory resources, and the like may be incapable of servicing each packet. This may cause packets to be dropped, packets to be delayed, or some other undesirable outcome for packets communicated by the virtual machines on a host.

Overview

The technology disclosed herein manages the execution of applications in virtual machines based on resource usage by a networking process provided by a hypervisor for the virtual machines. In one implementation, a method includes, in a hypervisor of a host computing system, monitoring one or more computing resources used by a networking process provided by the hypervisor. The method further provides determining that the one or more computing resources used by the networking process satisfy at least one criterion to modify the execution of at least one application. The method also includes, in response to determining that the computing resources satisfy the at least one criterion, notifying one or more agents in one or more virtual machines supported by the hypervisor to modify one or more execution parameters associated with at least one application in each of the one or more virtual machines.

DETAILED DESCRIPTION

Figure 1:
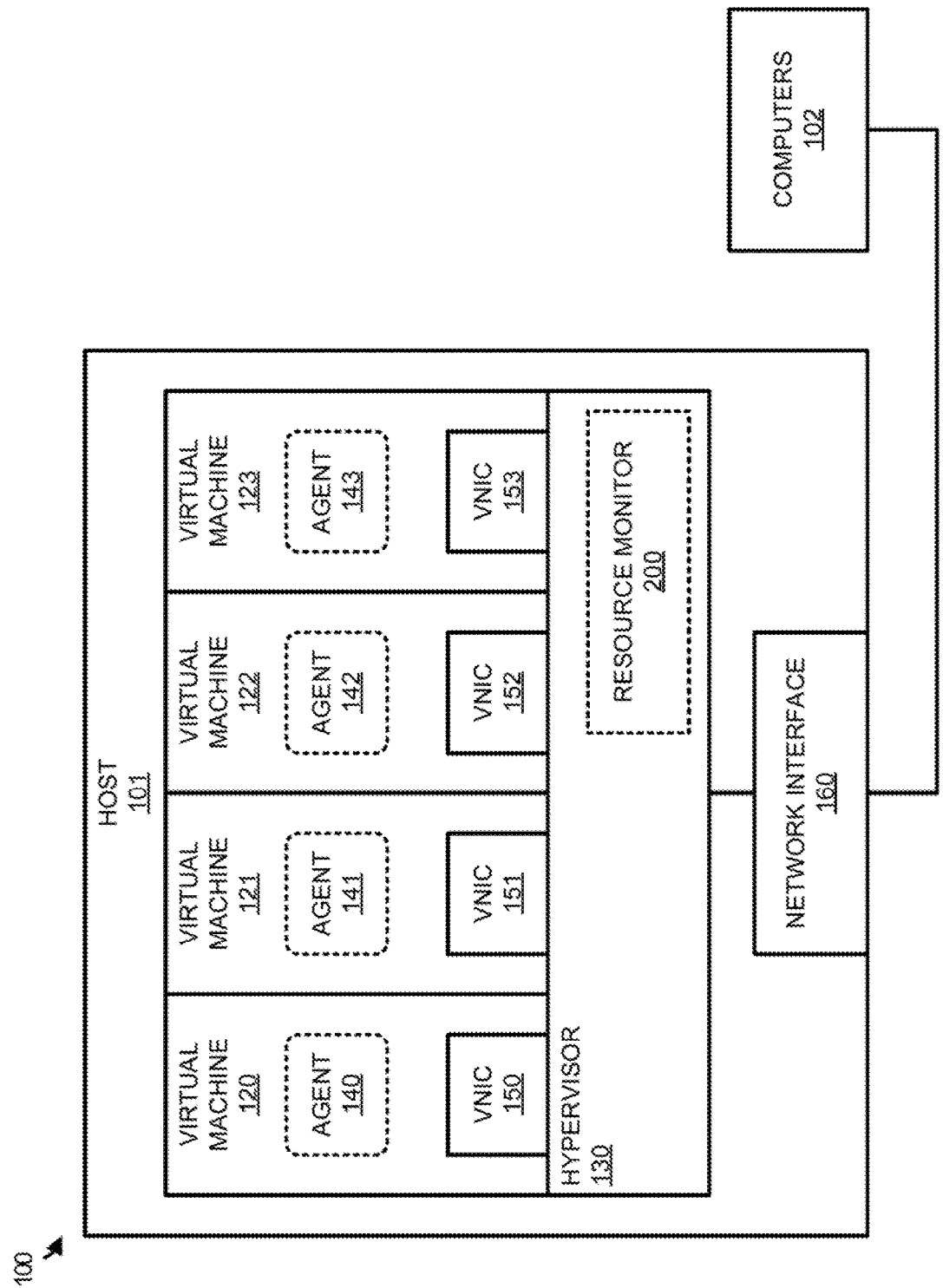
FIG. 1 illustrates a computing environment to manage the execution of applications in a virtual machine according to an implementation.

FIG. 1 illustrates a computing environment 100 to manage the execution of applications in a virtual machine according to an implementation. Computing environment 100 includes host 101 and computers 102. Host 101 further includes hypervisor 130, virtual machines 120-123, and network interface 160. Virtual machines 120-123 further include agents 140-143 and virtual network interfaces (VNICs) 150-153. Hypervisor 130 further includes resource monitor 200 that is described below in FIG. 2.

In operation, hypervisor 130 is deployed on host 101 to provide a platform for virtual machines 120-123. Hypervisor 130 may be used to provide abstracted computing resources to each of virtual machines 120-123, which may include processing resources, storage resources, memory resources, networking resources, and the like. Additionally, hypervisor 130 may be used to provide software defined networking operations for virtual machines 120-123. This software defined networking operations may include firewall operations, routing operations, switching operations, load balancing operations, private networking operations, or some other similar operations. In at least one implementation, firewall rules may be generated by one or more administrators associated with virtual machines 120-123 and may be applied using hypervisor 130. The firewall rules may be used to determine permissions associated with ingress and egress packets for the virtual machines. For example, a packet received by network interface 160 and directed at virtual machine 120 may be screened using one or more firewall rules associated with the virtual machines.

While implementing the software defined networking operations, hypervisor 130 may further use resource monitor 200 to monitor the physical resource usage associated with the networking operations. Resource monitor 200 may comprise one or more software routines comprising executable computer instructions residing on machine readable media as described in further detail below with reference to FIG. 6. The resource usage may include processing resource usage (such as central processing unit or CPU usage), memory usage, physical network interface usage, or some other resource usage, including combinations thereof. Based on the resource usage, the hypervisor may determine whether or not to change execution parameters associated with applications executing in virtual machines 120-123. These execution parameters may include slowing the execution of the applications, limiting network connections over VNICs 150-153, pausing socket connection calls in the virtual machines, or some other similar action. In some implementations, hypervisor 130 may communicate with agents 140-143 operating in virtual machines 120-123 to implement the required modification to the execution parameters.

Figure 2:
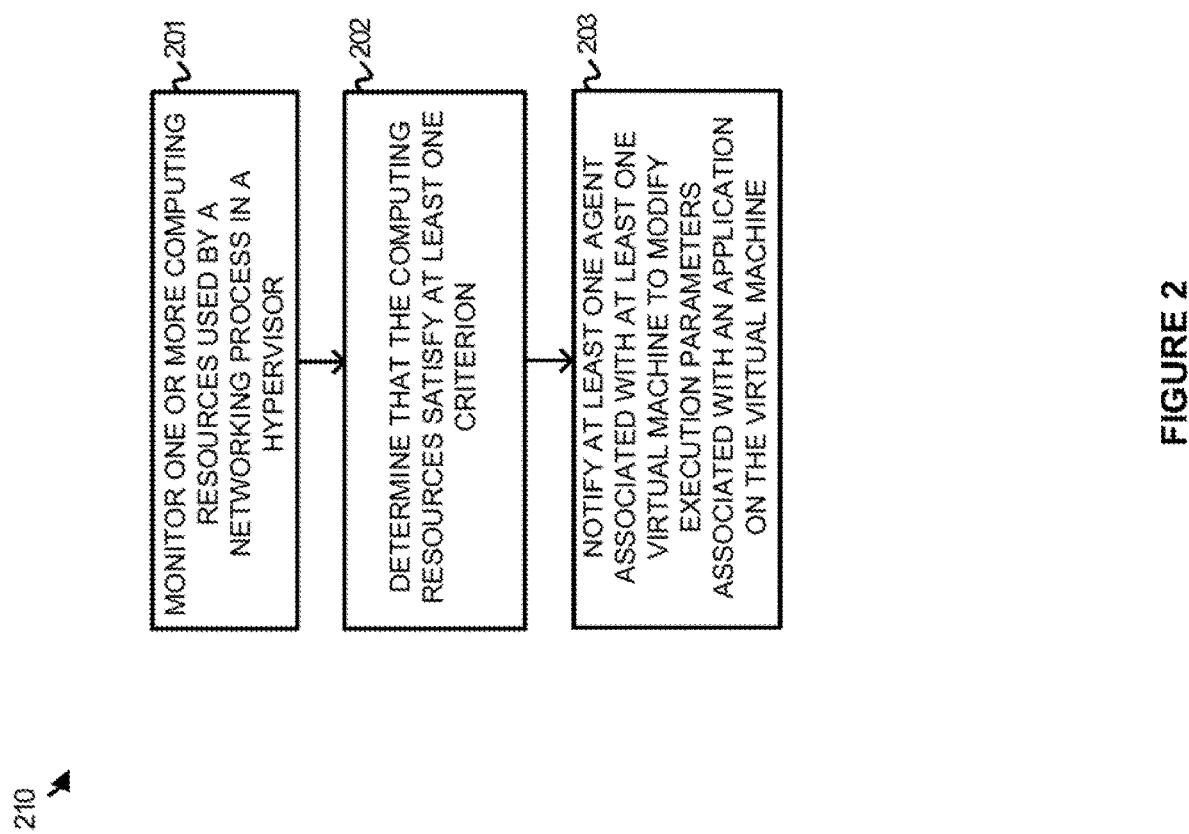
FIG. 2 illustrates a method for resource monitor to manage the execution of applications in virtual machines according to an implementation.

FIG. 2 illustrates a method 210 for resource monitor 200 to manage the execution of applications in virtual machines according to an implementation. The steps of method 210 are referenced parenthetically with reference to systems and elements of computing environment 100 of FIG. 1.

As depicted, resource monitor 200 operates in hypervisor 130 of host 101 to monitor (201) one or more computing resources used by a networking process provided by the hypervisor. The computing resources may include processing resources, memory resources, physical network interface resources, or some other resource. The networking process may comprise a firewall process, a switching process, a routing process, a private networking process, or some other software defined networking process, including combinations thereof. For example, hypervisor 130 may be used to provide a firewall for ingress packets received at network interface 160. When each packet is received, hypervisor may compare attributes of the packet to attributes defined in one or more firewalls to determine whether the packet should be forwarded to a destination virtual machine of virtual machines 120-123. As the quantity of packets increase that are processed by hypervisor 130, hypervisor 130 may require additional resources to support the firewall operations for the packets.

While monitoring the computing resources, resource monitor 200 further determines (202) that the computing resources satisfy at least one criterion to modify execution parameters associated with at least one application executing in at least one virtual machine executing on hypervisor 130. Returning to the example of the firewall, as the communication traffic increases over network interface, the computing resources required by the firewall may satisfy at least one criterion to modify the execution of one or more applications in virtual machines 120-123. The at least one criterion may comprise a threshold quantity of memory usage, a threshold quantity of processing resource usage, a threshold quantity of network interface usage, or some other similar criteria, including combinations thereof. The values associated with the at least one criterion may be defined by an administrator, may be determined based on resources available on host 101, or may be determined based on any other method. As an example, resource monitor 200 may determine configuration information associated with host 101, wherein the configuration information may determine physical resources available on host 101, the resources allocated to virtual machines on the host, or some other information related to the availability of resources to provide the networking processes for hypervisor 130. Based on the configuration information, resource monitor 200 may determine the criteria that should trigger changes to the execution parameters of at least one application.

Once the hypervisor 130 determines that the computing resource usage for the networking process satisfies the at least one criterion, resource monitor 200 further notifies (203) one or more agents in one or more virtual machines supported by the hypervisor to modify one or more execution parameters associated with at least one application in each of the one or more virtual machines. In some implementations, hypervisor 130 may notify each an agent in each of the virtual machines executing on host 101 to modify execution parameters on all of the virtual machines for host 101. In other implementations, hypervisor 130 may notify a subset of agents for virtual machines 120-123 to modify execution parameters on specific virtual machines.

In at least one example, virtual machines 120-123 may be segregated into different groups. These groups may be based on a tenant associated with the virtual machine (company, organization, subset of an organization, etc.), may be based on at least one application executing on the virtual machines, or may be based on any other factor. For example, virtual machines 120-121 may execute a first application, while virtual machines 122-123 may execute a second application. As a result, virtual machines 120-121 may be allocated to a first group and virtual machine 122-123 may be allocated to a second group. For each of the groups, hypervisor 130 may modify the execution parameters based on a quality of service associated with the group. In particular, based on the computing resource usage, hypervisor 130 may identify a group or set of groups that should change corresponding execution parameters. In this manner, groups associated with a lower quality of service may have execution parameters changed prior to groups associated with a higher quality of service.

In response to obtaining the notifications, each of the agents may change execution parameters associated with at least one application executing in the virtual machine. The execution parameters that are modified may be determined by the agent or may be specified by hypervisor 130 in the notification. For example, a notification from hypervisor 130 to agent 140 may indicate that a modification is required to an application executing in virtual machine 120. The changed execution parameter or parameters associated with the at least one application may include limiting communication requests for the application, limiting the execution rate of the application, or providing some other limitation in association with the application. For example, virtual machine 120 may represent a web service application. When agent 140 obtains a notification indicating a request to change the execution parameters associated with the application, agent 140 may modify parameters associated with the application to reduce the computing resources required by the networking on the host. Thus, agent 140 may limit the quantity of connections that are accepted by virtual machine 120 to limit the amount of traffic that is required to be processed using hypervisor 130.

In some implementations, the modified execution parameters may be implemented with the assistance hooks to the hypervisor. In particular, guest Transmission Control Protocol (TCP) or User Datagram Protocol (UDP) socket connect and receive functionality calls can be patched with the hypervisor hooks to intercept the socket calls and introduce sleep and suspend operations from the hypervisor. Advantageously, by using the sleep and suspend functionality supported by the hypervisor hooks, pressure on computing resources should be relieved, while the guest virtual machine may experience the waitlists. It should also be understood that these hooks may be removed in some examples, permitting the guest virtual machine to avoid the waitlists.

Although described in the previous example, as changing the execution parameters to reduce the load on hypervisor 130, it should be understood that similar operations may be used to increase the load on hypervisor 130. For example, while a first notification to an agent in virtual machines 120-123 may be used to reduce the network traffic processed by hypervisor 130, a second notification to the agent may be used to increase the traffic processed by hypervisor 130. The modification to the execution parameters may include accepting new connections for the application, increasing available bandwidth at the VNIC, or providing some other operation to change the execution parameters associated with the application. In at least one implementation, the notification to the agents may be associated with an expiration time. Thus, while the notification may change the execution parameters in the virtual machine, the changed execution parameters may occur until the expiration time is met.

In some implementations, the agents themselves within the virtual machines may be responsible for requesting information about the computing resources of the host. For example, the agent may identify delays or drops of packets by the host or may identify that a server resource is frequently blocked or unreachable from the virtual machine. When these events occur, which may be based on drops, delays, or unreachable time periods satisfying criteria, the agent may generate a query to the hypervisor to determine the cause of the event. In response to the request, the hypervisor may indicate information about the resource usage by the networking process to the agent and the agent may take a corresponding action to modify one or more execution parameters associated with at least one application on the virtual machine.

Figure 3:
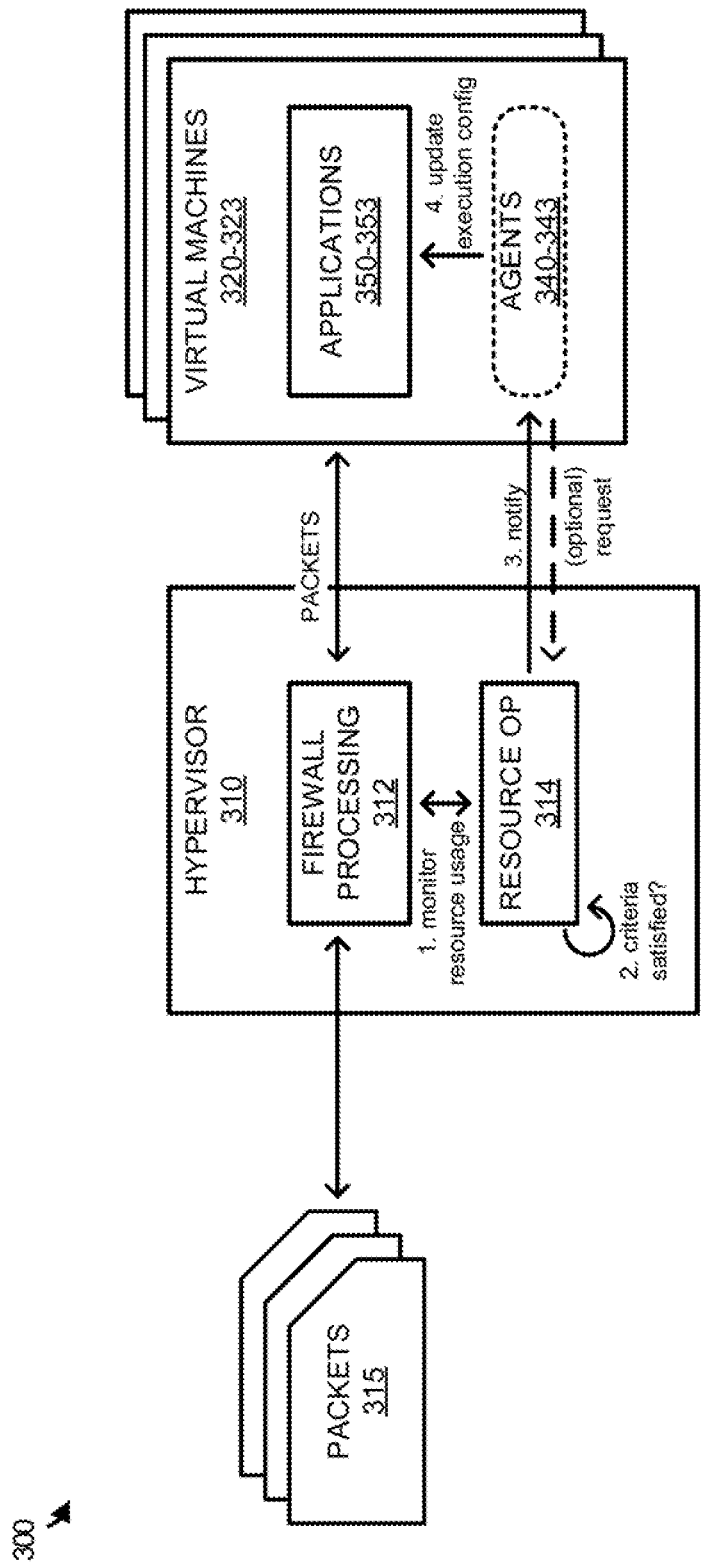
FIG. 3 illustrates an operational scenario of updating an execution configuration for applications in virtual machines according to an implementation.

FIG. 3 illustrates an operational scenario 300 of updating an execution configuration for applications in virtual machines according to an implementation. Operational scenario 300 includes packets 315, hypervisor 310, and virtual machines 320-323. Hypervisor 310 further includes firewall processing 312 and resource operation 314. Virtual machines 320-323 further include applications 350-353 and agents 340-343.

In operation, packets 315 are obtained by hypervisor 310 and processed by the hypervisor to provide various networking tasks. In at least one implementation, a networking task may include firewall processing 312, wherein firewall processing 312 may be used to permit or block ingress and egress packets associated with virtual machines 320-323, wherein data streams in the packets may be used by applications 350-353. While performing firewall processing 312, resource operation 314 monitors, at step 1, resource usage by firewall processing 312, the resources may include processing resources, memory resources, physical network interface resources, or some other resource of a host computing system. For example, each packet that is processed via firewall processing 312 may require memory resources. As the number of packets increase, the quantity of memory required to process the packets may also increase.

As resource operation 314 monitors the resource usage associated with firewall processing 312, resource operation 314 may determine, at step 2, when one or more criteria are satisfied that indicate a requirement to modify execution parameters associated with applications in virtual machines 320-323. In some implementations, the criteria may comprise administrator defined criteria, wherein the criteria may include a threshold quantity of memory usage, a threshold quantity of processing resource usage, or some other criteria, including combinations thereof. For example, an administrator associated with the host may define limits to the amount of memory available to firewall processing 312. Resource operation 314 may then determine when the memory resource usage by firewall processing 312 meets or exceeds the limits defined by the administrator.

In some implementations, the resource usage criteria may be dynamic based on the resources available on the host. The resources may include the identity of the processor on the host, the quantity of memory on the host, the types of physical interfaces on the host or some other available resource information. Further, the resource usage criteria may also be based on the resources dedicated to other operations on the host, wherein the operations may comprise virtual machine, services, or some other operation on the host. From the resource availability information, resource operation 314 may determine the one or more criteria associated with the memory usage by firewall processing 312. Advantageously, when more resources are available, resource operation 314 may increase the values associated with the criteria.

Once the one or more criteria are satisfied, resource operation 314 may notify, at step 3, agents 340-343 in virtual machines 320-323, indicating that the one or more criteria have been satisfied. In response to the notification, agents 340-343 may update, at step 4, the execution configuration associated with applications 350-353. In some implementations, resource operation 314 may indicate how to modify the configuration parameters associated with each of the application. In other implementations, agents 340-343 may determine how to modify the configuration parameters associated with the corresponding application. The updates to the configuration parameters may include decreasing the amount of connections that are accepted, decreasing the processing rate for the application, or providing some other operation with respect to the application. In at least some implementations, the modifications to the applications may be based on the resource usage that is causing the change to the execution parameters. For example, if networking resources are limited at the physical network interface, a first change to the application may be employed, whereas if memory resources are limited, a second change to the application may be employed.

In some implementations, the agents 340-343 may be responsible for requesting information about the computing resources of the host. For example, agent 340 may identify that a server resource is frequently blocked or unreachable from the virtual machine. When these events occur, which may be based on drops, delays, or unreachable time periods satisfying criteria, the agent may generate a query to the hypervisor to determine the cause of the event. In response to the request, the hypervisor may indicate information about the resource usage by the networking process to the agent and the agent may take a corresponding action to modify one or more execution parameters associated with at least one application on the virtual machine. Further, in some instances, resource operation 314 may provide one or more execution parameter changes that can be made to assist in making more resources available to firewall processing 312. This information may be provided to the requesting agent and may further be provided to other, possibly non-requesting agents, to provide additional resources for the firewall processing operation.

Figure 4:
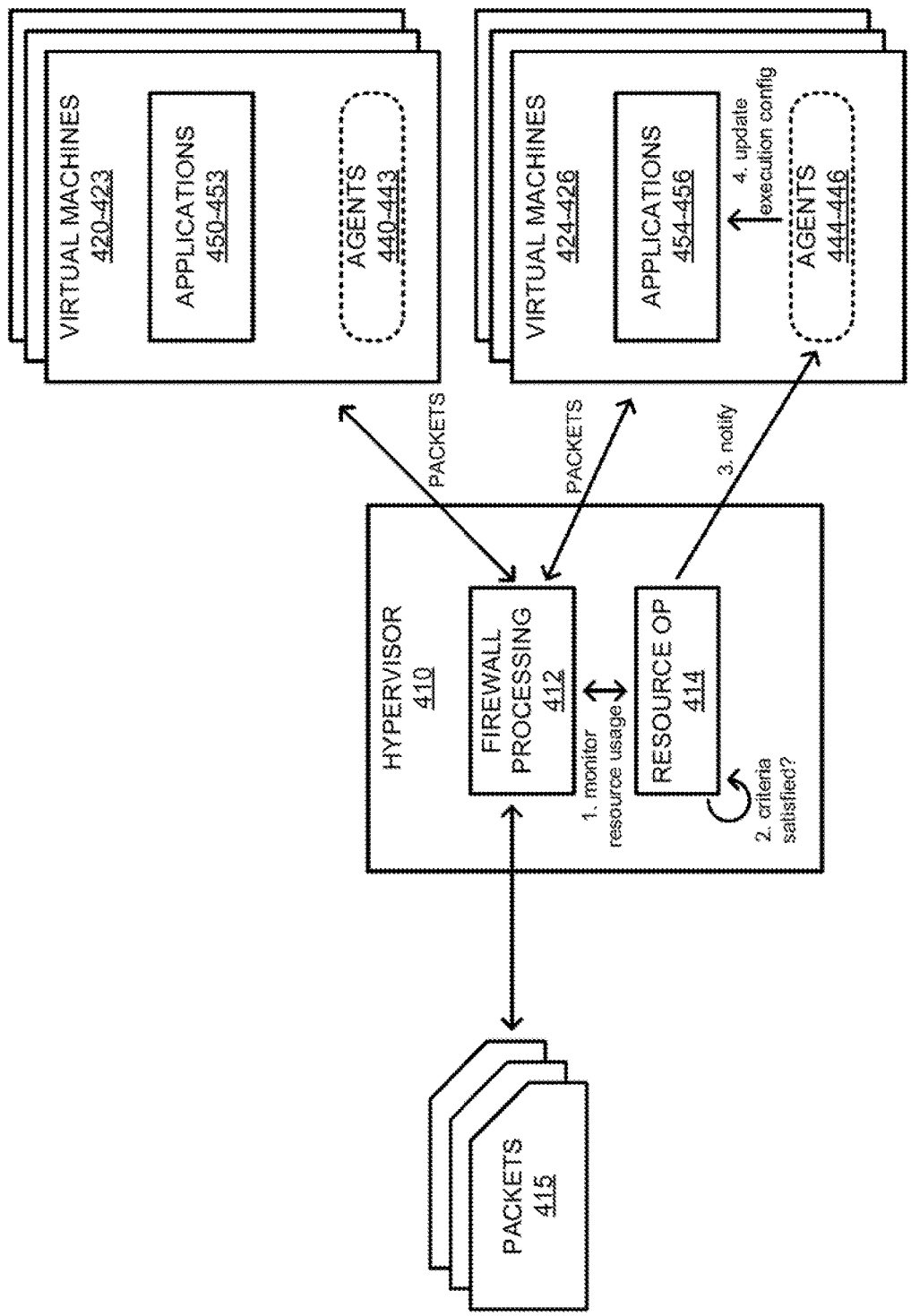
FIG. 4 illustrates an operational scenario of updating an execution configuration for applications in virtual machines according to an implementation.

FIG. 4 illustrates an operational scenario 400 of updating an execution configuration for applications in virtual machines according to an implementation. Operational scenario 400 includes packets 415, hypervisor 410, and virtual machines 420-426. Hypervisor 410 further includes firewall processing 412 and resource operation 414. Virtual machines 420-426 further include applications 450-456 and agents 440-446.

In operation, packets 415 are obtained by hypervisor 410 and processed by the hypervisor to provide various networking tasks. In at least one implementation, a networking task may include firewall processing 412, wherein firewall processing 412 may be used to permit or block ingress and egress packets associated with virtual machines 420-426. While performing firewall processing 412, resource operation 414 monitors, at step 1, resource usage by firewall processing 412, the resources may include processing resources, memory resources, physical network interface resources, or some other resource of a host computing system. For example, each packet that is processed via firewall processing 412 may require memory resources. As the number of packets increase, the quantity of memory required to process the packets may also increase.

As resource operation 414 monitors the resource usage associated with firewall processing 412, resource operation 414 may determine, at step 2, when one or more criteria are satisfied that indicate a requirement to modify execution parameters associated with applications in virtual machines 420-426. In some implementations, the criteria may comprise administrator defined criteria, wherein the criteria may include a threshold quantity of memory usage, a threshold quantity of processing resource usage, or some other criteria, including combinations thereof. For example, an administrator associated with the host may define limits to the amount of memory available to firewall processing 412. Resource operation 414 may then determine when the memory resource usage by firewall processing 412 meets or exceeds the limits defined by the administrator.

In some implementations, the resource usage criteria may be dynamic based on the resources available on the host. The resources may include the identity of the processor on the host, the amount of memory on the host, the types of physical interfaces on the host or some other available resource information. Further, the resource usage criteria may also be based on the resources dedicated to other operations on the host, wherein the operations may comprise virtual machine, services, or some other operation on the host. From the resource availability information, resource operation 414 may determine the one or more criteria associated with the memory usage by firewall processing 412. Advantageously, when more resources are available, resource operation 414 may increase the values associated with the criteria.

Once the criteria are satisfied, resource operation 414 may identify, at step 3, a subset of the virtual machines to notify regarding a modification to the execution parameters associated with application provided by the virtual machines. In some implementations, resource operation 414 may maintain one or more data structures that can associate resource usage conditions or satisfied criteria with applications to be modified. For example, when first criteria are satisfied for firewall processing 412, a first set of applications may be selected for parameter modifications, whereas when second criteria are satisfied for firewall processing 412, a second set of applications may be selected for parameter modifications. It should be understood that these applications may overlap in some examples. In some implementations, the various applications provided by virtual machines 420-426 may be associated with different qualities of service. For example, applications 454-456 may be associated with a first quality of service, while applications 450-453 are associated with a second quality of service. As a result, when criteria are satisfied that require applications with the first quality of service to modify execution parameters, resource operation 414 may select virtual machines 424-426 to receive a notification indicating a request to modify parameters associated with applications 454-456.

In response to receiving the notification, agents 444-446 may be used to update, at step 4, execution parameters for applications 454-456, which may include limiting resources available for the execution of applications 454-456, limiting the number of connections accepted by each application of applications 454-456, or providing some modification to applications 454-456. These limitations in resource may be used to permit the reclaimed resources to be available for a networking process, such as a firewall process or some other process. In some examples, resource operation 414 may be responsible for indicating the modification required by the applications. In other examples, agents 444-446 may receive the notification and determine the appropriate modification based on the notification, wherein the notification may indicate information about the resource usage to the agents, permitting the agents to make the required modifications.

Although demonstrated in the previous example as decreasing or limiting the execution parameters associated with an application, it should be understood that similar operations may be used increase execution parameters associated with an application. In at least one example, resource operation 414 may determine that criteria are satisfied that corresponds to an increase in available resources, such as an increase in available memory. In response to identifying that the criteria are satisfied, resource operation 414 may provide a notification to at least a subset of the virtual machines on the host to indicate or request a change in the execution parameters. In some implementations, the agents themselves may also be responsible for requesting information from resource operation 414 in response to identifying unreachable services, packet drops, or some other criteria. Once requested, resource operation 414 may provide resource usage information and/or changes to execution parameters to the requesting agent.

Figure 5:
FIG. 5 illustrates a data structure for managing configuration updates for virtual machines according to an implementation

FIG. 5 illustrates a data structure 500 for managing configuration updates for virtual machines according to an implementation. Data structure 500 includes resource conditions 510 with conditions 520-524 and virtual machine identifiers 511 with virtual machine groups 525-529.

As described herein, a hypervisor may monitor resource usage associated with a networking function or process provided by the hypervisor. The networking process may include a firewall process, a switch process, a routing process, or some other process, including combinations thereof. While monitoring the resource usage associated with the networking function, the hypervisor may determine when the resource usage satisfies criteria or conditions to modify the execution of at least a subset of the applications executing on virtual machines of the host.

Here, the hypervisor may maintain data structure 500 that associates conditions of resource usage to virtual machine groups that should have one or more application parameters modified based on the condition. For example, if resource usage for a networking process satisfies condition 521, then the hypervisor may identify virtual machine group 526 to change the parameters of one or more applications associated with virtual machine group 526. Although not depicted in data structure 500, it should be understood that the hypervisor may maintain information that indicates the type of modification that should be made to the execution parameters. This information may include reduction in processing rates, reduction in the quantity of requests accepted by the application, or some other information related to execution parameters of the application. Once a modification is identified, the hypervisor may communicate a notification to the corresponding virtual machine group indicating that a change is required in the execution parameters of the one or more applications associated with the virtual machine.

In some implementations, the resource usage criteria or conditions may correspond to user defined conditions, wherein the conditions may comprise processor usage by the networking process, memory usage by the networking process, physical network interface usage by the networking process, or some other user defined condition. In other implementations, the resource usage criteria or conditions may correspond to learned resources for the particular host, wherein the criteria may be based on the resources available on the host, such as the type of processor, the size of the available memory, the type of physical network interface, or some other information about the resources available on the host. Additionally, the hypervisor may determine how much of the resources are available to the networking process based on other processes that are executing on the host, wherein the other processes may include virtual machines, containers, support processes, or other processes on the host computing system. From the information about the host, the hypervisor may determine the conditions or criteria that can cause the modifications to the parameters of the various applications.

Although demonstrated as a table in the present example, it should be understood that linked lists, graphs, or other data structures may be used to trigger modifications to parameters associated with applications. Further, it should be understood that a virtual machine may belong to multiple virtual machine groups in data structure 500.

Figure 6:
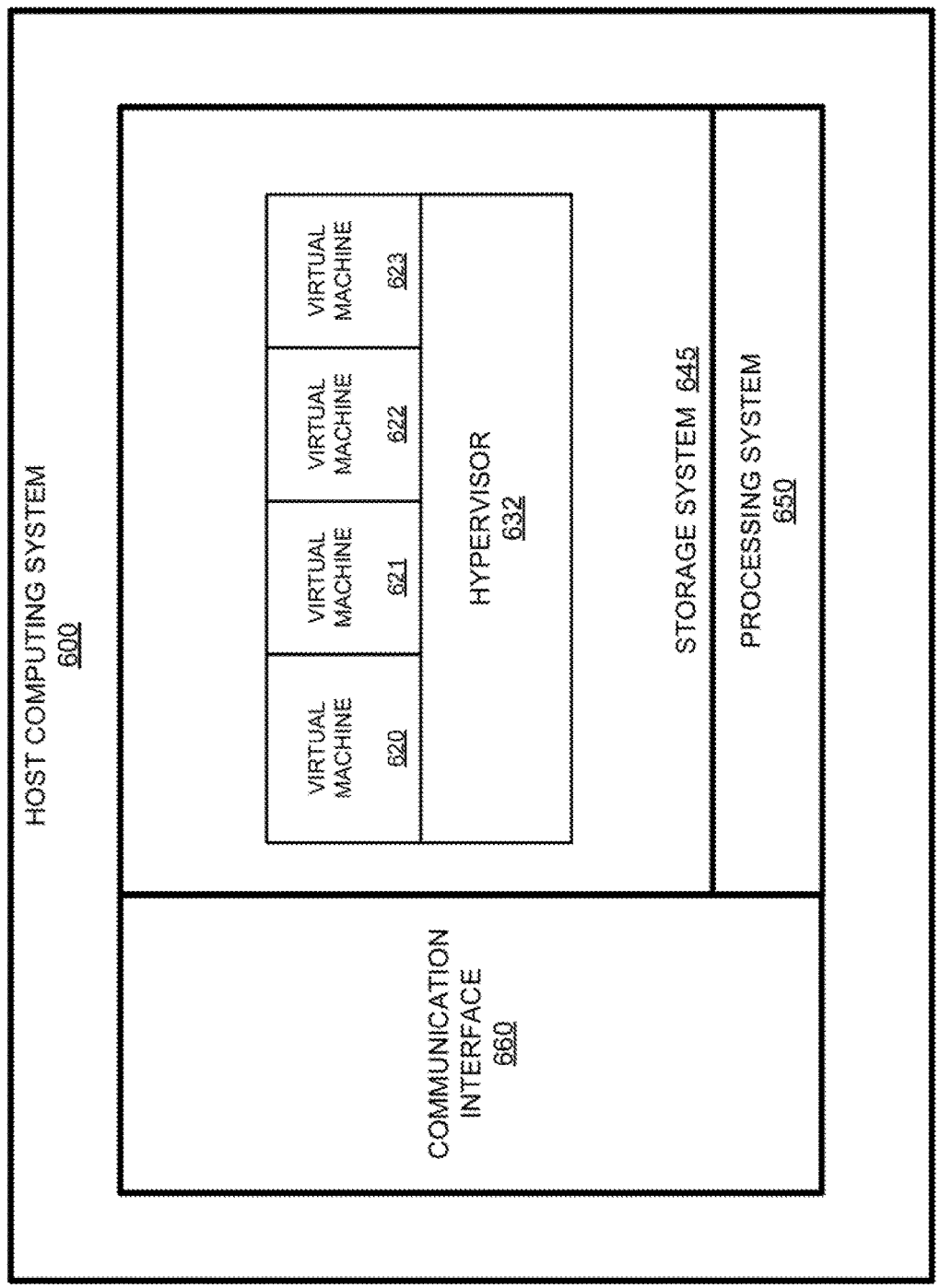
FIG. 6 illustrates a host computing system to provide a platform for virtual machines according to an implementation.

FIG. 6 illustrates a host computing system 600 to provide a platform for virtual machines according to an implementation. Host computing system 600 is representative of any computing system or systems with which the various operational architectures, processes, scenarios, and sequences disclosed herein for a host can be implemented. Host computing system 600 is an example of computing element 101 of FIG. 1, although other examples may exist. Host computing system 600 includes storage system 645, processing system 650, and communication interface 660. Processing system 650 is operatively linked to communication interface 660 and storage system 645. Communication interface 660 may be communicatively linked to storage system 645 in some implementations. Host computing system 600 may further include other components such as a battery and enclosure that are not shown for clarity.

Communication interface 660 comprises components that communicate over communication links, such as network cards, ports, radio frequency (RF), processing circuitry and software, or some other communication devices. Communication interface 660 may be configured to communicate over metallic, wireless, or optical links. Communication interface 660 may be configured to use Time Division Multiplex (TDM), Internet Protocol (IP), Ethernet, optical networking, wireless protocols, communication signaling, or some other communication format—including combinations thereof. Communication interface 660 is an example of a physical network interface that can be configured to communicate with other computing systems to provide required operations for the processes executing on computing system 600.

Processing system 650 comprises microprocessor and other circuitry that retrieves and executes operating software from storage system 645. Storage system 645 may include volatile and nonvolatile, removable and non-removable media implemented in any method or technology for storage of information, such as computer readable instructions, data structures, program modules, or other data. Storage system 645 may be implemented as a single storage device but may also be implemented across multiple storage devices or sub-systems. Storage system 645 may comprise additional elements, such as a controller to read operating software from the storage systems. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal.

Processing system 650 is typically mounted on a circuit board that may also hold the storage system. The operating software of storage system 645 comprises computer programs, firmware, or some other form of machine-readable program instructions. The operating software of storage system 645 comprises virtual machines 620-623 and hypervisor 632. The operating software on storage system 645 may further include utilities, drivers, network interfaces, applications, or some other type of software. When read and executed by processing system 650 the operating software on storage system 645 directs host computing system 600 to operate as described herein.

In at least one implementation, hypervisor 632 to provides a platform for the execution of virtual machines 620-623. Each virtual machine in virtual machines 620-623 may include at least one application that can provide various operations for a tenant associated with host computing system 600. These operations may include front end server operations, back end server operations, database management operations, or some other operations. While executing virtual machines 620-623, hypervisor 632 may monitor computing resources of host computing system 600 that are used by a networking process provided by the hypervisor. The networking process may include a hypervisor process, a switching process, a routing or encapsulation process, or some other process, including combinations thereof.

In monitoring the computing resource usage, hypervisor 632 may determine when the usage satisfies at least one criterion associated with modifying a configuration within at least one virtual machine of virtual machines 620-623. In some implementations, the at least one criterion may be defined by an administrator. For example, an administrator may define at what memory usage a subset of the virtual machines should be required to modify a configuration for at least one application in the subset of virtual machines. In some instances, the subset of virtual machines may be identified based on a quality of service associated with the applications and/or a tenant associated with the virtual machines. As a result, when the at least one criterion is satisfied, virtual machines 620-621 that are associated with a first quality of service may be required to modify a configuration, while virtual machines 622-623 that are associated with a second quality of service may not be required to modify a configuration.

In some implementations, in addition to or in place of receiving administrator preferences for the at least one criterion to modify the configuration, the at least one criterion may be based on the available computing resources of host computing system 600. In an example, hypervisor 632 may determine what physical resources are allocated to host computing system 600, including processor type, memory size, physical networking interface type, and the like, and determine how much of the resources are available for the networking process. Once the available resources are determined, hypervisor 632 may associate criteria with different virtual machines to modify application execution parameters based on the quality of service associated with the virtual machines. Thus, while an administrator associated with host computing system 600 may be used to define different qualities of service for each of the virtual machines (based on an application or tenant associated with the virtual machines), the hypervisor may be used, at least in part, to determine what criteria should trigger modifications to the virtual machines based on the quality of service.

Once the at least one criterion are satisfied, hypervisor 632 may generate a notification for the one or more virtual machines associated with the at least one criterion and communicate the notification to the one or more virtual machines. Once received, each of the one or more virtual machines may implement a modification to execution parameters associated with at least one application provided by the virtual machine. In some implementations, the notification provided to the virtual machine may indicate the modification to be implemented. In particular, hypervisor 632 may maintain one or more data structures that may indicate required changes to reflect conditions in the networking process of hypervisor 632. These modifications may include limiting a communication acceptance rate associated with the at least one application, pausing socket connection calls from the operating systems of the virtual machine(s), limiting a processing or execution rate associated with the at least one application, or an input/output networking limitation associated with the at least one application. In other implementations, the virtual machines may determine the modification to the execution parameters based on one or more locally maintained data structures.

In at least one example, hypervisor 632 may monitor memory usage by a firewall process for virtual machines 620-623. When the firewall usage satisfies a criterion, such as a maximum memory usage value, hypervisor 632 may select at least a subset of virtual machines 620-623 to modify parameters associated with at least one application provided by the subset. In some examples, the subset for the modification may be selected based on a quality of service assigned to the at least one application associated with the subset. Once selected, the hypervisor may communicate a notification to an agent operating inside the selected subset of one or more virtual machines and the agent may implement the required modifications to the execution parameters. This modification may include increasing a value associated with a parameter, decreasing a value associated with a parameter, or some other modification to the execution parameters.

Returning to the elements of FIG. 1, host 101 may comprise a physical host computing system or a virtual machine executing on a physical host computing system. The host computing system may comprise communication interfaces, network interfaces, processing systems, computer systems, microprocessors, storage systems, storage media, or some other processing devices or software systems, and can be distributed among multiple devices. The host computing system may comprise software such as an operating system, logs, databases, utilities, drivers, networking software, and other software stored on a computer-readable medium.

Computers 102 may comprise physical computing systems, virtual machines, containers, or some other similar type of computing element. Computers 102 may comprise communication interfaces, network interfaces, processing systems, computer systems, microprocessors, storage systems, storage media, or some other processing devices or software systems, and can be distributed among multiple devices. Computers 102 may comprise software such as an operating system, logs, databases, utilities, drivers.

Communication between host 101 and computers 102 may use metal, glass, optical, air, space, or some other material as the transport media. Communication between host 101 and computers 102 may use various communication protocols, such as Time Division Multiplex (TDM), asynchronous transfer mode (ATM), Internet Protocol (IP), Ethernet, synchronous optical networking (SONET), hybrid fiber-coax (HFC), circuit-switched, communication signaling, wireless communications, or some other communication format, including combinations, improvements, or variations thereof. Communication between host 101 and computers 102 may be a direct link or can include intermediate networks, systems, or devices, and can include a logical network link transported over multiple physical links.

The descriptions and figures included herein depict specific implementations of the claimed invention(s). For the purpose of teaching inventive principles, some conventional aspects have been simplified or omitted. In addition, some variations from these implementations may be appreciated that fall within the scope of the invention. It may also be appreciated that the features described above can be combined in various ways to form multiple implementations. As a result, the invention is not limited to the specific implementations described above, but only by the claims and their equivalents.

What is claimed is:

1. A method comprising:
   in a hypervisor of a host, monitoring usage of one or more computing resources by a networking process provided by the hypervisor for forwarding or blocking packets to and from one or more virtual machines, the computing resources comprising a CPU usage, memory usage;
   determining that the usage of the one or more computing resources by the networking process satisfies one or more criteria, the one or more criteria comprising the CPU usage exceeding a predetermined threshold; and
   in response to determining that the usage of the one or more computing resources by the networking process satisfies the one or more criteria, notifying the one or more virtual machines supported by the hypervisor to modify one or more execution parameters associated with at least one application in each of the one or more virtual machines;
   causing a reduction in the CPU usage in response to a determination that the CPU usage exceeding the predetermined threshold.

2. The method of claim 1, wherein notifying the one or more virtual machines comprises notifying one or more agents in the one or more virtual machines, and wherein the method further comprises, in each of the one or more agents, modifying the one or more execution parameters associated with the at least one application.

3. The method of claim 1 further comprising:
   in response to determining that the usage of the one or more computing resources by the networking process satisfy the at least one criterion, selecting the one or more virtual machines from a set of virtual machines on the host based on the at least one application in each of the one or more virtual machines.

4. The method of claim 3, further comprising obtaining a selection, wherein the selection associates the at least one application in the one or more virtual machines to the at least one criterion.

5. The method of claim 1, wherein the one or more computing resources comprise memory usage, processing system usage, and/or physical network interface usage.

6. The method of claim 1 further comprising determining the at least one criterion based on physical resources available on the host.

7. The method of claim 1, wherein the one or more execution parameters associated with the at least one application comprise a communication acceptance rate associated with the at least one application, a processing rate associated with the at least one application, or an input/output networking limitation associated with the at least one application.

8. The method of claim 1, wherein notifying the one or more virtual machines to modify the one or more execution parameters comprises notifying the one or more virtual machines to decrease or increase at least one value associated with the execution parameters.

9. The method of claim 1, wherein the networking process comprises a firewall process, a switching process, or a routing process.

10. A host comprising:
   memory;
   at least one processor operatively coupled to the memory; and
   program instructions stored on the memory that, when executed by the at least one processor, direct the host to:
      in a hypervisor of the host, monitor usage of one or more computing resources by a networking process provided by the hypervisor for forwarding or blocking packets to and from one or more virtual machines, the computing resources comprising a CPU usage, memory usage;
      determine that the usage of the one or more computing resources by the networking process satisfies one or more criteria, the one or more criteria comprising the CPU usage exceeding a predetermined threshold; and
   in response to determining that the usage of the one or more computing resources by the networking process satisfies the one or more criteria, notify the one or more virtual machines supported by the hypervisor to modify one or more execution parameters associated with at least one application in each of the one or more virtual machines;
      causing a reduction in the CPU usage in response to a determination that the CPU usage exceeding the predetermined threshold.

11. The host of claim 10, wherein notifying the one or more virtual machines comprises notifying one or more agents in the one or more virtual machines, and wherein the method further comprises, in each of the one or more agents, modifying the one or more execution parameters associated with the at least one application.

12. The host of claim 10, wherein the program instructions further direct the host to:
   in response to determining that the usage of the one or more computing resources by the networking process satisfy the at least one criterion, select the one or more virtual machines from a set of virtual machines on the host based on the at least one application in each of the one or more virtual machines.

13. The host of claim 12, wherein the program instructions further direct the host to obtain a selection, wherein the selection associates the at least one application in the one or more virtual machines to the at least one criterion.

14. The host of claim 10, wherein the one or more computing resources comprise memory usage, processing system usage, and/or physical network resource usage.

15. The host of claim 10, wherein the program instructions further direct the host to determine the at least one criterion based on physical resources available on the host.

16. The host of claim 10, wherein the one or more execution parameters associated with the at least one application comprise a communication acceptance rate associated with the at least one application, a processing rate associated with the at least one application, or an input/output networking limitation associated with the at least one application.

17. The host of claim 10, wherein notifying the one or more virtual machines to modify the one or more execution parameters comprises notifying the one or more virtual machines to decrease or increase at least one value associated with the execution parameters.

18. The host of claim 10, wherein the networking process comprises a firewall process, a switching process, or a routing process.

19. An apparatus comprising:
   memory;
   program instructions stored on the memory to operate a host that, when executed by at least one processor, direct the at least one processor to:
      in a hypervisor of the host, monitor usage of one or more computing resources by a networking process provided by the hypervisor for forwarding or blocking packets to and from one or more virtual machines, the computing resources comprising a CPU usage, memory usage;
      determine at least one criterion to trigger a configuration modification in the one or more virtual machines supported by the hypervisor based at least in part on available physical resources of the host;
      determine that the usage of the one or more computing resources by the networking process satisfies the at least one criterion;
      in response to determining that the usage of the one or more computing resources by the networking process satisfies the at least one criterion, notify the one or more virtual machines supported by the hypervisor to modify one or more execution parameters associated with at least one application in each of the one or more virtual machines;
      cause a reduction in the CPU usage in response to a determination that the CPU usage exceeding the predetermined threshold; and
   in the one or more virtual machines, modify the one or more execution parameters associated with the at least one application.

20. The apparatus of claim 19, wherein the one or more computing resources comprise memory usage, processing system usage, and/or physical network interface usage.

* * * * *